US007978489B1

(12) United States Patent
Telefus et al.

(10) Patent No.: US 7,978,489 B1

(45) Date of Patent: Jul. 12, 2011

(54) INTEGRATED POWER CONVERTERS

(75) Inventors: Mark Telefus, Orinda, CA (US); Bahman Sharifipour, Westford, MA (US); Rowell Gapuz, Quezon (PH); Richard Sy, Quezon (PH); HongWei Du, San Jose, CA (US); Bob Roohparvar, Monte Sereno, CA (US)

(73) Assignee: Flextronics AP, LLC, Broomfield, CO (US)

( * ) Notice: Subject to any disclaimer, the term of this patent is extended or adjusted under 35 U.S.C. 154(b) by 463 days.

(21) Appl. No.: 12/221,567

(22) Filed: Aug. 4, 2008

Related U.S. Application Data

(60) Provisional application No. 60/963,477, filed on Aug. 3, 2007.

(51) Int. Cl.
*H02M 1/00* (2007.01)

(52) U.S. Cl. ........................................ 363/146; 363/142

(58) Field of Classification Search .................... 363/17, 363/89, 141–146, 21.04; 320/110, 138; 307/80, 307/82, 85

See application file for complete search history.

(56) References Cited

U.S. PATENT DOCUMENTS

| | | | | |
|---|---|---|---|---|
| 4,051,425 | A | 9/1977 | Smith | 363/86 |
| 4,273,406 | A * | 6/1981 | Okagami | 439/620.21 |
| 4,695,933 | A | 9/1987 | Nguyen et al. | |
| 4,712,160 | A | 12/1987 | Sato et al. | 361/388 |
| 4,788,626 | A | 11/1988 | Neidig et al. | 361/386 |
| 4,841,220 | A | 6/1989 | Tabisz et al. | |
| 4,857,822 | A | 8/1989 | Tabisz et al. | |
| 4,866,367 | A | 9/1989 | Ridley et al. | |
| 4,890,217 | A * | 12/1989 | Conway | 363/143 |
| 4,893,227 | A | 1/1990 | Gallios et al. | 363/26 |

(Continued)

FOREIGN PATENT DOCUMENTS

| | | |
|---|---|---|
| JP | 4217869 A | 8/1992 |

(Continued)

OTHER PUBLICATIONS

Hang-Seok Choi et al., Novel Zero-Voltage and Zero-Current-Switching (ZVZCS) Full-Bridge PWM Converter Using Coupled Output Inductor, 2002 IEEE, pp. 641-648.

(Continued)

*Primary Examiner* — Rajnikant B Patel

(74) *Attorney, Agent, or Firm* — Haverstock & Owens LLP

(57) ABSTRACT

A power supply adapter is provided. The power supply adapter includes a power converter circuit configured to generate a regulated voltage signal. The power converter circuit includes a rectifier coupled with AC power blades. A regulator circuit is coupled with the rectifier. A transformer is coupled with the regulator circuit. The transformer includes a primary and a secondary. The transformer is coupled with the regulator circuit via the primary. An output circuit is coupled with the secondary of the transformer. The output circuit includes an output capacitor. A flexible contact is coupled with each of a first and a second printed circuit board and flexibly biased to couple with a proximate end of the AC power blades. The adapter includes an EMI shield substantially surrounding a connector receptacle. The power converter circuit can include a forward or a flyback power converter. The transformer can include a planar format transformer coupled with the first or the second PCB. The transformer can include a metallic core of a ferrite material. The transformer core can be coupled with the EMI shield to provide thermal spreading. The adapter can include an enclosure for housing the power converter circuit. The enclosure includes a thermally conductive potting material substantially filling an empty space of an interior of the enclosure.

63 Claims, 5 Drawing Sheets

U.S. PATENT DOCUMENTS 4,899,256 A 2/1990 Sway-Tin ..................... 361/386
4,901,069 A 2/1990 Veneruso ...................... 340/853
5,101,322 A 3/1992 Ghaem et al. ................. 361/386
5,164,657 A 11/1992 Gulczynski ................... 323/275
5,235,491 A 8/1993 Weiss ............................ 361/694
5,262,932 A 11/1993 Stanley et al. .................. 363/26
5,295,044 A 3/1994 Araki et al. ................... 361/709
5,438,294 A 8/1995 Smith
5,490,052 A 2/1996 Yoshida et al.
5,565,761 A 10/1996 Hwang ......................... 323/222
5,565,781 A 10/1996 Dauge ........................... 324/403
5,592,128 A 1/1997 Hwang ........................... 331/61
5,673,185 A 9/1997 Albach et al.
5,712,772 A 1/1998 Telefus et al.
5,742,151 A 4/1998 Hwang ......................... 323/222
5,747,977 A 5/1998 Hwang ......................... 323/284
5,786,687 A 7/1998 Faulk
5,798,635 A 8/1998 Hwang et al. ................. 323/222
5,804,950 A 9/1998 Hwang et al. ................. 323/222
5,811,895 A 9/1998 Suzuki et al. ................. 307/125
5,818,207 A 10/1998 Hwang ......................... 323/288
5,870,294 A 2/1999 Cyr ................................. 363/41
5,894,243 A 4/1999 Hwang ......................... 327/540
5,903,138 A 5/1999 Hwang et al. ................. 323/266
5,905,369 A 5/1999 Ishii et al. ..................... 323/272
5,923,543 A 7/1999 Choi ............................... 363/21
6,058,026 A 5/2000 Rozman
6,069,803 A 5/2000 Cross .............................. 363/21
6,091,233 A 7/2000 Hwang et al. ................. 232/222
6,091,611 A * 7/2000 Lanni .............................. 363/79
6,160,725 A 12/2000 Jansen ............................ 363/65
6,272,015 B1 8/2001 Mangtani ...................... 361/707
6,282,092 B1 8/2001 Okamoto et al. ............. 361/704
6,323,627 B1 11/2001 Schmiederer et al.
6,326,740 B1 12/2001 Chang et al.
6,344,980 B1 2/2002 Hwang et al.
6,396,277 B1 5/2002 Fong et al. .................... 324/402
6,407,514 B1 6/2002 Glaser et al. .................. 315/247
6,469,914 B1 10/2002 Hwang et al. .............. 363/210.1
6,469,980 B1 10/2002 Takemura et al. .......... 369/275.3
6,483,281 B2 11/2002 Hwang ......................... 323/299
6,487,095 B1 11/2002 Malik et al.
6,531,854 B2 3/2003 Hwang ......................... 323/285
6,541,944 B2 4/2003 Hwang ......................... 323/225
6,578,253 B1 6/2003 Herbert ........................... 29/605
6,583,999 B1 6/2003 Spindler et al.
6,605,930 B2 8/2003 Hwang ......................... 323/225
6,657,417 B1 12/2003 Hwang ......................... 323/222
6,671,189 B2 12/2003 Jansen et al. ............... 363/21.14
6,674,272 B2 1/2004 Hwang ......................... 323/284
6,958,920 B2 10/2005 Mednik et al. .................. 363/19
6,970,366 B2 11/2005 Apeland et al.
7,035,126 B1 * 4/2006 Lanni ............................ 363/142
7,038,406 B2 5/2006 Wilson
7,047,059 B2 5/2006 Avrin et al. ................... 600/409
7,064,497 B1 6/2006 Hsieh
7,212,420 B2 * 5/2007 Liao .............................. 363/146
7,286,376 B2 10/2007 Yang
7,324,354 B2 1/2008 Joshi et al.
7,450,388 B2 * 11/2008 Beihoff et al. ................ 361/715
7,499,301 B2 * 3/2009 Zhou ............................. 363/146
7,570,497 B2 8/2009 Jacques et al.
7,764,515 B2 7/2010 Jansen et al.
2002/0011823 A1 1/2002 Lee ............................... 320/137
2003/0035303 A1 2/2003 Balakrishnan et al. ......... 363/16
2004/0228153 A1 11/2004 Cao et al. ........................ 363/71
2005/0105224 A1 5/2005 Nishi .............................. 361/18
2005/0281425 A1 12/2005 Greuet et al. ................. 381/331

FOREIGN PATENT DOCUMENTS

JP 10243640 A 9/1998
JP 2000083374 A 3/2000
JP 2000253648 A 9/2000
JP 2004208357 A 7/2004
WO WO 2005/122377 A1 12/2005

OTHER PUBLICATIONS

Notice of Allowance dated Sep. 17, 2010. U.S. Appl. No. 12/079,662, filed Mar. 27, 2008, first named inventor: Mark Telefus, 27 pages.
EE Times.com—"Team Claims Midrange Wireless Energy Transfer", by R. Colin Johnson, 4 pages, Nov. 6, 2007.
EE Times.com—"Wireless Beacon Could Recharge Consumer Devices", by R. Colin Johnson, 3 pages, Nov. 6, 2007.
"New Architectures for Radio-Frequency dc/dc Power Conversion", Juan Rivas et al., Laboratory for Electromagnetic and Electronic Systems, Massachusetts Institute of Technology, Room 10-171 Cambridge, MA 02139, pp. 4074-4084, Jan. 2004.
Scollo, P. Fichera R., "Electronic Transformer for a 12V Halogen Lamp", Jan. 1999, ST Microelectronics pp. 1-4.

* cited by examiner

INTEGRATED POWER CONVERTERS

RELATED APPLICATIONS

This patent application claims priority under 35 U.S.C. 119(e) of the co-pending U.S. Provisional Pat. App. No. 60/963,477, filed Aug. 3, 2007, entitled "INTEGRATED ENCLOSURE FOR POWER CONVERTERS", which is hereby incorporated by reference.

FIELD OF THE INVENTION

The present invention relates to the field of power supplies. More particularly, the present invention relates to an integrated enclosure for a power supply adapter.

BACKGROUND

In many applications a power supply apparatus includes a separate enclosure for housing a pair of AC power blades and also includes another container for enclosing the electrical components of a power converter circuit. The current power converters poorly and inefficiently utilize the three-dimensional space of the enclosure for housing the power converter. This leads to a poor watt per cubic inch ratio for the power converter. Current power converters also make inefficient uses of the enclosure for EMI shielding and thermal dissipation.

Accordingly, it is desirable to create an integrated enclosure for a power converter circuit with a greatly increased efficiency and cost.

SUMMARY OF THE INVENTION

In accordance with a first aspect of the present invention, a power supply adapter is provided. The power supply adapter includes a power converter circuit configured to generate a regulated voltage signal. The power converter circuit includes a rectifier coupled with AC power blades. A regulator circuit is coupled with the rectifier. A transformer is coupled with the regulator circuit. The transformer includes a primary and a secondary. The transformer is coupled with the regulator circuit via the primary. An output circuit is coupled with the secondary of the transformer. The output circuit includes an output capacitor. A flexible contact is coupled with each of a first and a second printed circuit board and flexibly biased to couple with a proximate end of the AC power blades.

The adapter can include an EMI shield of a sheet of conductive material substantially surrounding a connector receptacle. The EMI shield is coupled between the first and the second PCB. The EMI shield can include a metallic sheet or a metallic sheet mesh. The power converter circuit can include a forward or a flyback power converter. The transformer can include a planar format transformer coupled with the first or the second PCB. The transformer can include a metallic core of a ferrite material. The transformer core can be coupled with the EMI shield to provide thermal spreading.

The adapter can include an enclosure of a first section including a predominately planar structure, the AC power blades, the first and the second printed circuit board (PCB) and a second section of the enclosure coupled with the first section. The first and the second PCB include a connector receptacle coupled in between. The second section includes a predominately cubical structure for enclosing the power converter circuit. The enclosure includes a thermally conductive potting material substantially filling an empty space of an interior of the enclosure.

In yet another embodiment of the invention, a captured power cable is substituted in place of the connector receptacle. In still another embodiment, the interface can comprise a flat outer periphery of the first section and a recessed edge of the second section for securely coupling the first section with the second section.

Other features of the present invention will become apparent from consideration of the following description taken in conjunction with the accompanying drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

Figure 1A:
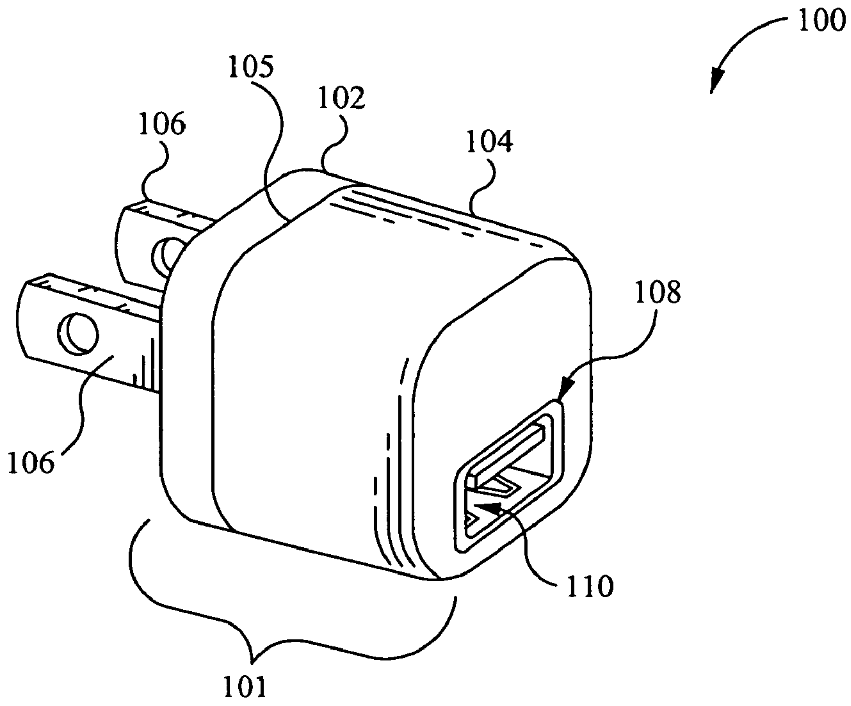
FIG. 1A illustrates a perspective view of a power supply adapter in accordance with an embodiment of the invention.
Figure 1B:
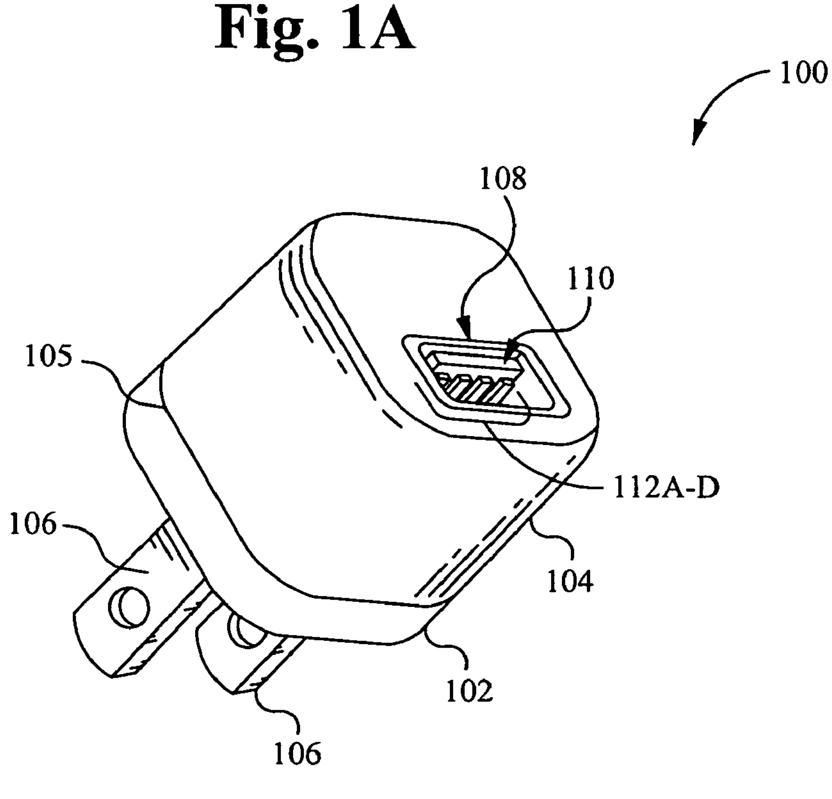
FIG. 1B illustrates another perspective view of a power supply adapter in accordance with an embodiment of the invention.

FIGS. 1A and 1B show perspective views of a power supply adapter 100 in accordance with an embodiment of the invention. The adapter 100 provides maximum use of a three-dimension space occupied by the power supply adapter 100 and provides thermal dissipation and EMI shielding using novel features as described below. The adapter 100 generally includes a first section 102 of an enclosure 101 and a second section 104 of the enclosure 101 coupled with the first section 102. AC power blades 106 are coupled with the first section 102. The second section 104 includes an aperture 108 in alignment with a connector receptacle 110. The connector receptacle 110 is configured for receiving a power connector (not shown). The first section 102 and the second section 104 are coupled together at an interface 105, which strengthens the coupling of the first and the second section 102, 104. The adapter 100 provides the enclosure 101 for a power converter circuit (not shown) as well as functioning as the enclosure 101 for the AC power blades 106. The first and second sections 102, 104 together efficiently dissipate thermal energy of the power converter circuit. The adapter 100 is inserted into an AC power source via the AC power blades 106. The power connector (not shown) can be inserted within the connector receptacle 110. In an exemplary embodiment, the connector receptacle 110 comprises a universal serial bus (USB) connector receptacle. The power connector includes an attached power cable for powering a computer, a computer accessory, mp3 player, cell phone, or other electronic devices.

Figure 2A:
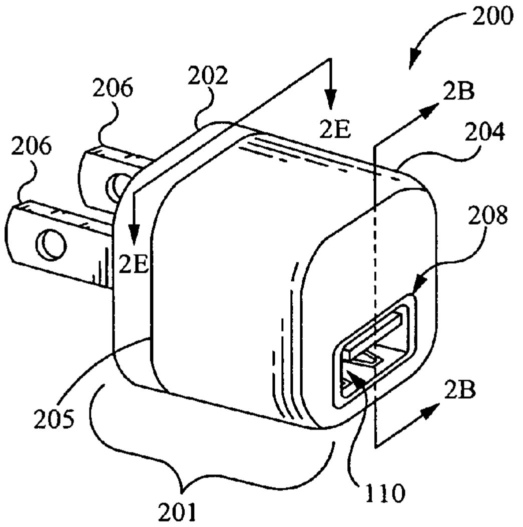
FIG. 2A illustrates a perspective view of a power supply adapter in accordance with an embodiment of the invention.
Figure 2B:
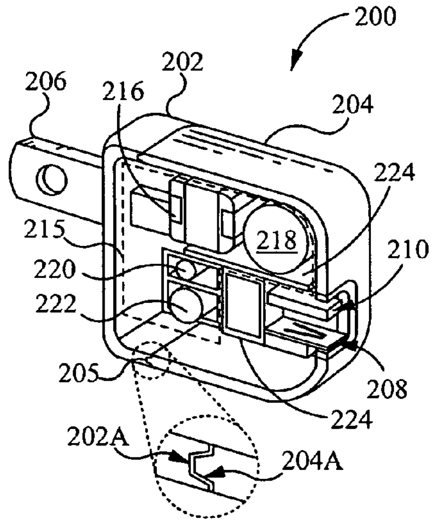
FIG. 2B illustrates a cross-sectional view of a power supply adapter, taken along the line 2B-2B of FIG. 2A, in accordance with an embodiment of the invention.

FIGS. 2A through 2E show an exemplary embodiment of a power supply adapter 200 in accordance with an embodiment of the invention. FIG. 2B shows a cross-sectional view of the power supply adapter 200, in accordance with an embodiment of the invention. The adapter 200 is configured as an integrated enclosure for a power converter circuit. The adapter 200 generally includes a first section of an enclosure 202 and a second section of an enclosure 204 coupled with the first section 202. AC power blades 206 are coupled with the first section 202. The second section 204 includes an aperture 208 in alignment with a connector receptacle 210. The connector receptacle 210 is configured for receiving a power connector (not shown). The first section 202 and the second section 204 are coupled together at an interface 205, which strengthens the coupling of the first section 202 to the second section 204.

Figure 2C:
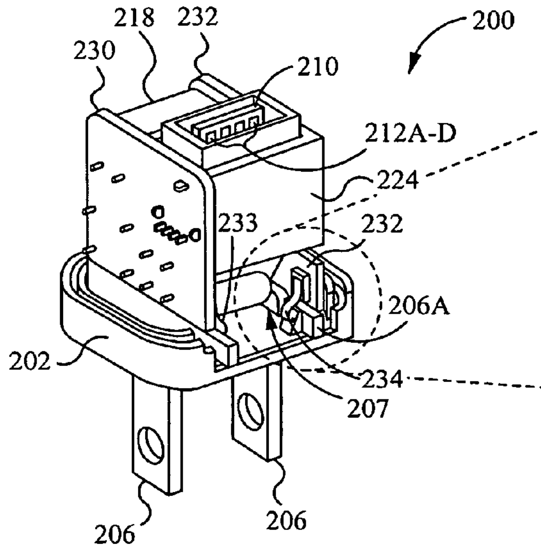
FIG. 2C illustrates a perspective view of a power supply adapter with a second section removed in accordance with an embodiment of the invention.
Figure 2D:
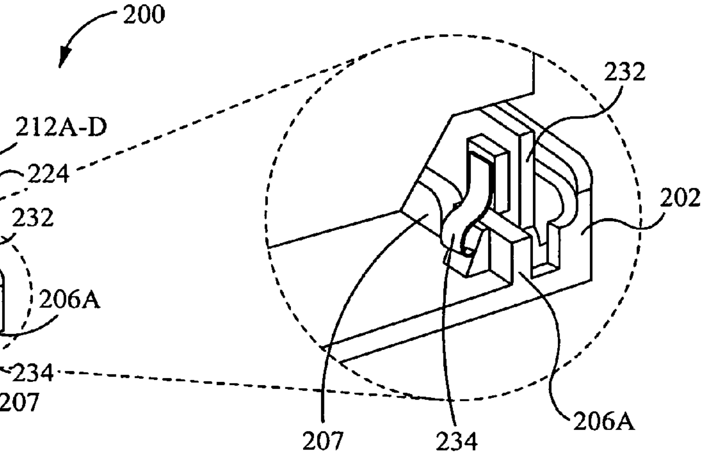
FIG. 2D illustrates a partial enlarged perspective view of a power supply adapter in accordance with an embodiment of the invention.
Figure 2E:
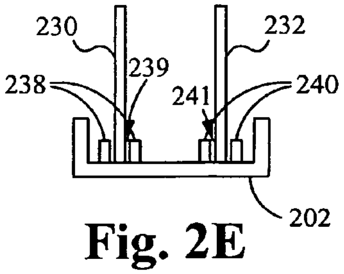
FIG. 2E illustrates a partial cross-sectional view of a power supply adapter, taken along the line 2E-2E of FIG. 2A, in accordance with an embodiment of the invention.

FIGS. 2C and 2D show additional details of the power supply adapter 200 in accordance with an embodiment of the invention. FIG. 2C shows a perspective view of the power supply adapter 200 with the second section 204 removed to better show details of the first section 202. The first section 202 of the enclosure 201 generally comprises a predominately planar structure and includes the AC power blades 206, openings 207 for receiving the AC power blades 206, a first and a second printed circuit board (PCB) 230, 232, respectively, a first and a second PCB slot 238, 240, respectively, a power converter circuit 215 (FIG. 2B), a connector receptacle 210 and an electromagnetic interference (EMI) shield 224.

The first section 202 includes a raised periphery surrounding the predominately planar structure. The predominately planar structure provides a platform suitable for attaching the first and the second PCB 230, 232 and attaching elements of the power converter circuit 215 that will be described below. In an exemplary embodiment, the first section 202 comprises a generally rectangular shape, here shown with rounded corners. In an alternative embodiment, the first section 202 can comprise a generally circular shape. In still another embodiment, the first section 202 can comprise various other shapes that can couple with an appropriately shaped second section 204. The first section 202 preferably comprises a suitable durable non-metallic, electrically insulating material. In an exemplary embodiment, first section 202 comprises a plastic material. The plastic material can include a property that allows a high thermal dissipation through the wall of the first section 202. A thickness of the wall of the first section 202 can be chosen to suit a specific design requirement. In an exemplary embodiment, the thickness of the wall of the first section 202 comprises 1.8 mm.

The openings 207 for receiving the AC power blades 206 preferably comprise fitted holes. In this way, the openings 207 and the first section 202 provide support for attaching the AC power blades 206 to the first section 202. The AC power blades 206 comprise prongs or terminals made of a suitable durable conductor. In an exemplary embodiment, the AC power blades 206 comprise a metal. A person of skill in the art will appreciate the variety of possible metals suitable for the AC power blades 206. In an alternative embodiment, the first section 202 can include a ground prong or ground terminal (not shown) in addition to the AC power blades 206. The ground terminal can be supported by forming an additional opening in the first section 202. The first section 202 can be formed using methods known to a person of skill in the art such as by a molding or an extrusion process. Further, the first section 202 can include a layer of conductive material applied on an interior surface of the first section 202 to provide additional EMI shielding.

The first PCB slot 239 comprises a pair of raised edges 238 protruding from the first section 202. The second PCB slot 241 comprises a corresponding pair of raised edges 240 protruding from the first section 202. The pairs of raise edges 238 and 240 provide surfaces for receiving and supporting the first and the second printed circuit boards 230, 232. The first and the second PCB slots 239, 241 are formed on the interior surface of the predominately planar structure of the first section 202. The first and the second PCB slots 239, 241 are preferably configured on the first section 202 opposite and parallel to each other.

The first and the second printed circuit board 230, 232 preferably comprise planar, predominately rectangular structures of a size appropriate for fitting securely within the first and the second PCB slots 239, 241. The first and the second PCB 230, 232 include a first and a second spring contact 233, 234 respectively coupled therewith. Typically, the first and the second PCB 230, 232 comprise a non-conductive substrate patterned with conductive pathways or traces. The first and the second PCB 230, 232 provide a mechanical support and an electrical interconnection for electronic components of the power converter circuit 215 which are mounted thereon. The electrical interconnection of the electronic components of the power converter circuit 215 is provided by the conductive traces. The mechanical support is provided by holes or vias formed on the first and second PCBs 230, 232. The first and the second PCB 230, 232 are configured opposite and parallel to each other when the first and the second PCB 230, 232 are attached within the first and second PCB slots 239, 241.

The first and the second spring contacts 233, 234 comprise suitable conductors coupled on a periphery of the first and the second PCB 230, 232. The first and the second spring contacts 233, 234 are flexibly biased to securely couple with a proximate end 206A of the AC power blades 206. The first and the second spring contacts 233, 234 provide an electrical coupling of the AC power source through the AC power blades 206 to the power converter circuit 215. The first and the second spring contacts 233, 234 comprise a suitable flexible, durable and conductive material. In an exemplary embodiment, the spring contacts 233, 234 comprise a metallic material of appropriate thickness.

FIG. 2B shows certain elements of the power converter circuit 215. The power converter circuit 215 comprises an input rectifier 220, a regulator circuit 222, an output transformer 216 and an output capacitor 218. In an exemplary embodiment, the power converter circuit 215 is configured as a forward or a flyback power converter. A person of skill in the art will appreciate that several other power converter topologies exist, any of which that can be substituted for the topologies discussed. The input rectifier 220 converts an AC power source entering through the AC power blades 206 into a rectified voltage signal. The rectified voltage signal is coupled with the regulator circuit 222, which generates a regulated voltage signal. The regulated voltage signal is a constant voltage that is coupled to the output transformer 216. The regulator circuit 222 can include an inductor for coupling the rectified voltage signal from the input rectifier 220 to a regulator switch, such as a suitable transistor. In another embodiment, the regulator circuit 222 comprises a pulse width modulator circuit. The output transformer 216 receives the regulated voltage signal and provides electromagnetic coupling of the regulated voltage signal to the output capacitor 218, such that a regulated DC voltage is provided at the connector receptacle 210. The output transformer 216 comprises a suitable transformer which is easily integrated within the enclosure 201. The output transformer 216 includes a secondary and a primary. The primary can be coupled with the regulator circuit 222 and the secondary can be coupled with the output capacitor 218. In an exemplary embodiment, the output transformer 216 comprises a planar format transformer. The output transformer 216 can include a ferrite core. As a planar format transformer, the output transformer 216 includes electromagnetic properties that provide shielding of EMI signals which can be generated by the power converter circuit 215. A person of skill in the art will appreciate that the planar format transformer 216 allows a low-height profile and provides a high power density.

The connector receptacle 210 comprises an interface for receiving and attaching with a power connector (not shown). The connector receptacle 210 is coupled with the first and the second PCB 230, 232. The connector receptacle 210 includes conductive leads 212A-D for providing a regulated DC voltage signal to the attached power connector. In an exemplary embodiment, the connector receptacle comprises a universal serial bus (USB) receptacle. A person of skill in the art can appreciate that other types of connector receptacles for receiving other types of power connectors can be substituted for the USB connector receptacle 210.

The EMI shield 224 comprises a rigid or semi-rigid sheet of conductive material for providing a barrier for EMI generated by the power converter circuit 215. The EMI shield 224 can also provide structural support for the connector receptacle 210 and the electronic components of the power converter circuit 215. The EMI shield 224 is coupled with the first and the second PCB 230, 232. The EMI shield 224 substantially surrounds the connector receptacle 210 and prevents EMI transfer from the power converter circuit 215 'up-line' through the attached power connector (not shown). Further, the EMI shield 224 inhibits EMI from radiating to a surrounding area beyond the adapter 200. The EMI shield 224 comprises any of a variety of conductive materials known to a person of skill in the art. In an exemplary embodiment, the EMI shied 224 comprises a metallic material. The metallic material can comprise a type of sheet metal, or alternatively a sheet mesh. Further, the EMI shield 224 provides a thermal shielding and thermal dissipation function by radiating thermal energy generated by the power converter circuit 215. In one embodiment, the EMI shield 224 can be coupled with the ferrite core of the output transformer 216 to provide a thermal spreading function.

The second section 204 of the enclosure 201 generally includes a predominately cubical structure 204 having a uniform interior surface. The second section 204 includes the aperture 208 in alignment with the connector receptacle 210. The aperture 208 allows access for the connector receptacle 210 to receive the power connector (not shown). The second section 204 provides a suitable structure for enclosing the first section 202 including the attached components described above. In one embodiment, the second section 204 can include a thermally conductive potting material that substantially fills an empty space of an interior of the second section 204 and the enclosure 201. The potting material can thermally couple heat from heat sources, such as the output transformer 216 to the EMI shield 224 from which it can radiate into an air channel of the connector receptacle 210. In an alternative embodiment, the second section 204 can comprise a generally cylindrical shape. In still another embodiment, the second section 204 can comprise various other shapes that can couple with an appropriately shaped first section 202. The second section 204 comprises a suitable durable non-metallic, electrically insulating material. In an exemplary embodiment, second section 204 comprises a plastic material. The plastic material can include a property that allows a high thermal dissipation through the wall of the second section 204. A thickness of the wall of the second section 204 can be chosen to suit a specific design requirement. In an exemplary embodiment, the thickness of the wall of the second section 204 comprises 1.8 mm.

In an alternative embodiment, the second section 204 can include a first and a second set of PCB slots (not shown) each comprising a first and a second pair of fitted slots each comprising a pair of raised edges protruding from the interior surface of the second section 204. The first and the second set of PCB slots (not shown) provide surfaces for receiving and supporting the first and the second PCB 230, 232. The first and the second set of PCB slots (not shown) can be configured on the interior surfaces of the second section 204 that are opposing each other so that the first pair of fitted slots are configured opposite and parallel to each other and the second pair of fitted slots are also configured opposite and parallel to each other.

The second section 204 can be formed using methods known to a person of skill in the art such as by a molding or an extrusion process. Further, the second section 204 can include a layer of conductive material applied on the interior surface to provide additional EMI shielding.

As shown in FIG. 2B, the interface 205 comprises a junction including a concave surface 202A and a convex surface 204A. The concave surface 202A and the convex surface 204A are configured to provide secure coupling of the first section 202 to the second section 204. The interface 205 can be further strengthened by applying a suitable adhesive between the concave and the convex surface 202A, 204A. In an alternative embodiment, the interface 205 can be configured such that the concave and the convex surface 202A, 204A are interlocking; secure coupling of the first and the second section 202, 204 are achieved by using a sufficient force to press the first and the second section 202, 204 together.

Figure 3A:
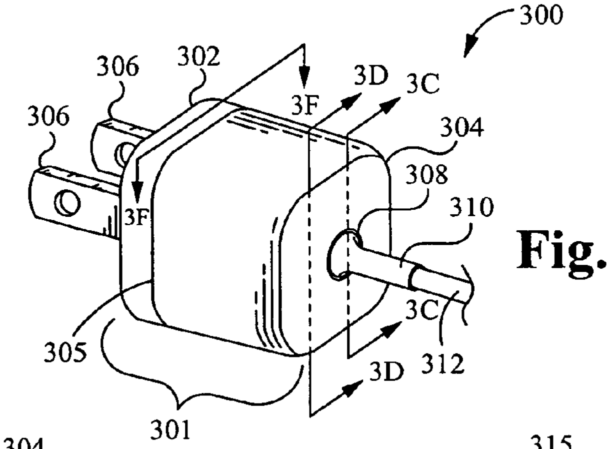
FIG. 3A illustrates a perspective view of a power supply adapter in accordance with an alternate embodiment of the invention.
Figure 3B:
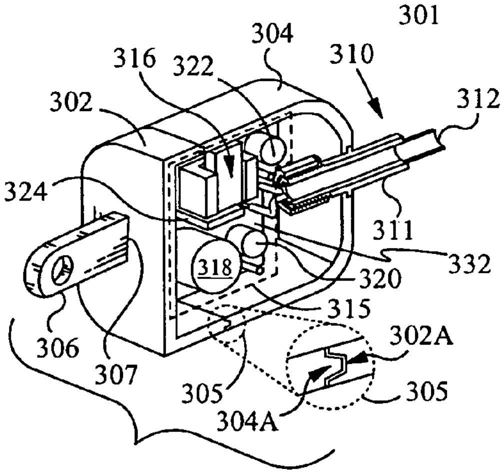
FIG. 3B illustrates a cross-sectional view of a power supply adapter, taken along the line 3B-3B of FIG. 3A, in accordance with an alternate embodiment of the invention.
Figure 3C:
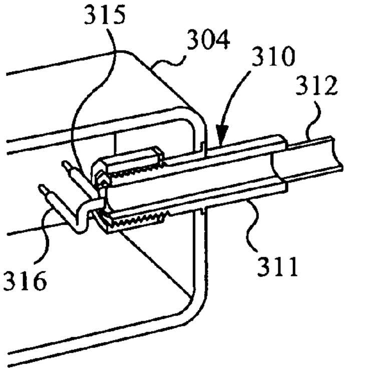
FIG. 3C illustrates a partial cross-sectional view of a power supply adapter, taken along the line 3C-3C of FIG. 3A, in accordance with an alternate embodiment of the invention.
Figure 3D:
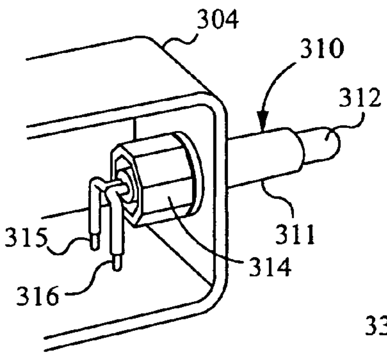
FIG. 3D illustrates a partial cross-sectional view of a power supply adapter, taken along the line 3D-3D of FIG. 3A, in accordance with an alternate embodiment of the invention.
Figure 3E:
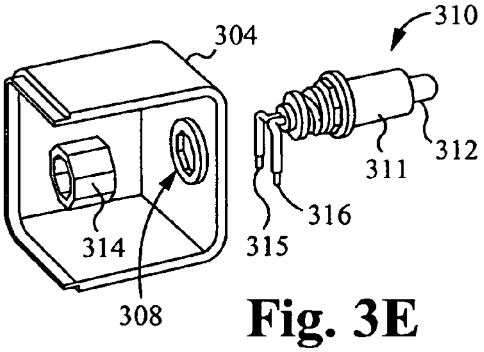
FIG. 3E illustrates a partial exploded view of a power supply adapter, taken along the line 3D-3D of FIG. 3A, in accordance with an alternate embodiment of the invention.
Figure 3F:
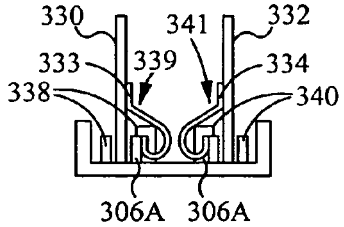
FIG. 3F illustrates a partial cross-sectional view of a power supply adapter, taken along the line 3F-3F of FIG. 3A, in accordance with an alternate embodiment of the invention.

FIGS. 3A through 3F show an alternative embodiment of a power supply adapter 300 in accordance with an embodiment of the invention. FIG. 3B shows a cross-sectional view of the power supply adapter 300, in accordance with an embodiment of the invention. The adapter 300 is configured as an integrated enclosure for a power converter circuit. The adapter 300 generally includes a first section of an enclosure 302 and a second section of an enclosure 304 coupled with the first section 302. AC power blades 306 are coupled with the first section 302. The second section 304 includes an aperture 308 in alignment with a captured power cable 310. The first section 302 and the second section 304 are coupled together at an interface 305, which strengthens the coupling of the first section 302 to the second section 304.

The first section 302 of the enclosure 301 is similar to the previous embodiment and comprises a predominately planar structure. The first section 302 generally includes the AC power blades 306, openings 307 for receiving the AC power blades 306, a first and a second printed circuit board (PCB) 330, 332, respectively, a first and a second PCB slot 339, 341, respectively, a power converter circuit 315 (FIG. 3B), a captured power cable 310 and an electromagnetic interference (EMI) shield 324.

The first section 302 includes a raised periphery surrounding the predominately planar structure. The predominately planar structure provides a platform suitable for attaching the first and the second PCB 330, 332 and attaching elements of the power converter circuit 315 that will be described below. In an exemplary embodiment, the first section 302 comprises a generally rectangular shape, here shown with rounded corners. In an alternative embodiment, the first section 302 can comprise a generally circular shape. In still another embodiment, the first section 302 can comprise various other shapes that can couple with an appropriately shaped second section 304. The first section 302 comprises a suitable durable non-metallic, electrically insulating material. In an exemplary embodiment, first section 302 comprises a plastic material. The plastic material can include a property that allows a high thermal dissipation through the wall of the first section 302. A thickness of the wall of the first section 302 can be chosen to suit a specific design requirement. In an exemplary embodiment, the thickness of the wall of the first section 302 comprises 1.8 mm.

The openings 307 for receiving the AC power blades 306 preferably comprise fitted holes. In this way, the openings 307 and the first section 302 provide support for attaching the AC power blades 306 to the first section 302. The AC power blades 306 comprise prongs or terminals made of a suitable durable conductor. In an exemplary embodiment, the AC power blades 306 comprise a metal. A person of skill in the art will appreciate the variety of possible metals suitable for the AC power blades 306. In an alternative embodiment, the first section 302 can include a ground prong or ground terminal (not shown) in addition to the AC power blades 306. The ground terminal can be supported by forming an additional opening in the first section 302. The first section 302 can be formed using methods known to a person of skill in the art such as by a molding or an extrusion process. Further, the first section 302 can include a layer of conductive material applied on an interior surface of the first section 302 to provide additional EMI shielding.

The first and the second PCB slots 339, 341 are similar to the previous embodiment. The first PCB slot comprises a pair of raised edges 338 protruding from the first section 302. The second PCB slot 341 comprises a corresponding pair of raised edges 340 protruding from the first section 202. The pairs of raise edges 338 and 340 provide surfaces for receiving and supporting the first and the second printed circuit boards 330, 332. The first and the second PCB slots 339, 341 are formed on the interior surface of the predominately planar structure of the first section 302. The first and the second PCB slots 339, 341 are preferably configured on the first section 302 opposite and parallel to each other.

The first and the second printed circuit board 330, 332 preferably comprise planar, predominately rectangular structures of a size appropriate for fitting securely within the first and the second PCB slots 339, 341. The first and the second PCB 330, 332 include a first and a second spring contact (not shown) respectively coupled therewith similar to the previous embodiment. Typically, the first and the second PCB 330, 332 comprise a non-conductive substrate patterned with conductive pathways or traces. The first and the second PCB 330, 332 provide a mechanical support and an electrical interconnection for electronic components of the power converter circuit 315 which are mounted thereon. The electrical interconnection of the electronic components of the power converter circuit 315 is provided by the conductive traces. The mechanical support is provided by holes or vias formed on the first and second PCBs 330, 332. The first and the second PCB 330, 332 are configured opposite and parallel to each other when the first and the second PCB 330, 332 are attached within the first and second PCB slots 339, 341.

The first and the second spring contacts (not shown) comprise suitable conductors coupled on a periphery of the first and the second PCB 330, 332. The first and the second spring contacts are flexibly biased to securely couple with a proximate end of the AC power blades 306. The first and the second spring contacts provide an electrical coupling of the AC power source through the AC power blades 306 to the power converter circuit 315. The first and the second spring contacts comprise a suitable flexible, durable and conductive material. In an exemplary embodiment, the spring contacts comprise a metallic material of appropriate thickness.

FIG. 3B shows certain elements of the power converter circuit 315. The power converter circuit 315 comprises an input rectifier 320, a regulator circuit 322, an output transformer 316 and an output capacitor 318. In an exemplary embodiment, the power converter circuit 315 is configured as a forward or a flyback power converter. A person of skill in the art will appreciate that several other power converter topologies exist, any of which that can be substituted for the topologies discussed. The input rectifier 320 converts an AC power source entering through the AC power blades 306 into a rectified voltage signal. The rectified voltage signal is coupled with the regulator circuit 322, which generates a regulated voltage signal. The regulated voltage signal is a constant voltage that is coupled to the output transformer 316. The regulator circuit 322 can include an inductor for coupling the rectified voltage signal from the input rectifier 320 to a regulator switch, such as a suitable transistor. In another embodiment, the regulator circuit 322 comprises a pulse width modulator circuit. The output transformer 316 receives the regulated voltage signal and provides electromagnetic coupling of the regulated voltage signal to the output capacitor 318, such that a regulated DC voltage is provided at the captured power cable 310. The output transformer 316 comprises a suitable transformer which is easily integrated within the enclosure 301. The output transformer 316 includes a secondary and a primary. The primary can be coupled with the regulator circuit 322 and the secondary can be coupled with the output capacitor 318. In an exemplary embodiment, the output transformer 316 comprises a planar format transformer. The output transformer can include a ferrite core. As a planar format transformer, the output transformer 316 includes electromagnetic properties that provide shielding of EMI signals which can be generated by the power converter circuit 315. A person of skill in the art will appreciate that the planar format transformer 316 allows a low-height profile and provides a high power density.

The captured power cable 310 comprises an interface for coupling with an output node (not shown) of the power converter circuit 315. The captured power cable 310 generally includes a first and a second power conductor 315, 316, an outer sheath 312, an integrated mounting screw 311, and a mounting nut 314. A person of skill in the art will appreciate that the captured power cable 310 can further include other features which are not shown such as, a twisted pair data line, a drain wire, a conductive braid and a foil cover. The captured power cable 310 is coupled with the first and the second PCB 330, 332 via the power conductors 315, 316 for providing a regulated DC voltage signal to an electronic device attached with the captured power cable 310. In an exemplary embodiment, the captured power cable 310 comprises a universal serial bus (USB) capture power cable. A person of skill in the art can appreciate that other types of captured power cables can be substituted for the USB captured power cable 310.

The EMI shield 324 is similar to the previous embodiment and comprises a rigid or semi-rigid sheet of conductive material for providing a barrier for EMI generated by the power converter circuit 315. The EMI shield 324 can also provide structural support for the electronic components of the power converter circuit 315. The EMI shield 324 is coupled with the first and the second PCB 330, 332. The EMI shield 324 substantially surrounds the captured power cable 310 and prevents EMI transfer from the power converter circuit 315 'up-line' through the captured power cable 310 to the attached electronic device. Further, the EMI shield 324 inhibits EMI from radiating to a surrounding area beyond the adapter 300. The EMI shield 324 comprises any of a variety of conductive materials known to a person of skill in the art. In an exemplary embodiment, the EMI shied 324 comprises a metallic material. The metallic material can comprise a type of sheet metal, or alternatively a sheet mesh. Further, the EMI shield 324 provides a thermal shielding and thermal dissipation function by radiating thermal energy generated by the power converter circuit 315. In one embodiment, the EMI shield 324 can be coupled with the ferrite core of the output transformer 316 to provide a thermal spreading function.

The second section 304 of the enclosure 301 generally includes a predominately cubical structure 304 having a uniform interior surface. The second section 304 includes the aperture 308 in alignment with the captured power cable 310. The aperture 308 allows access for the captured power cable 310 and provides an attachment structure for the integrated mounting screw 311, and the mounting nut 314. The second section 304 provides a suitable structure for enclosing the first section 302 including the attached components described above. In one embodiment, the second section 304 can include a thermally conductive potting material that substantially fills an empty space of an interior of the second section 304 and the enclosure 301. The potting material can thermally couple heat away from heat sources, such as the output transformer 316 to the EMI shield 324. In an alternative embodiment, the second section 304 can comprise a generally cylindrical shape. In still another embodiment, the second section 304 can comprise various other shapes that can couple with an appropriately shaped first section 302. The second section 304 comprises a suitable durable non-metallic, electrically insulating material. In an exemplary embodiment, second section 304 comprises a plastic material. The plastic material can include a property that allows a high thermal dissipation through the wall of the second section 304. A thickness of the wall of the second section 304 can be chosen to suit a specific design requirement. In an exemplary embodiment, the thickness of the wall of the second section 304 comprises 1.8 mm.

In an alternative embodiment, the second section 304 can include a first and a second set of PCB slots (not shown) each comprising a first and a second pair of fitted slots each comprising a pair of raised edges protruding from the interior surface of the second section 304. The first and the second set of PCB slots (not shown) provide surfaces for receiving and supporting the first and the second PCB 330, 332. The first and the second set of PCB slots (not shown) can be configured on the interior surfaces of the second section 304 that are opposing each other so that the first pair of fitted slots are configured opposite and parallel to each other and the second pair of fitted slots are also configured opposite and parallel to each other.

The second section 304 can be formed using methods known to a person of skill in the art such as by a molding or an extrusion process. Further, the second section 304 can include a layer of conductive material applied on the interior surface to provide additional EMI shielding.

As shown in FIG. 3B, the interface 305 comprises a junction including a concave surface 302A and a convex surface 304A. The concave surface 302A and the convex surface 304A are configured to provide secure coupling of the first section 302 to the second section 304. The interface 305 can be further strengthened by applying a suitable adhesive between the concave and the convex surface 302A, 304A. In an alternative embodiment, the interface 305 can be configured such that the concave and the convex surface 302A, 304A are interlocking; secure coupling of the first and the second section 302, 304 are achieved by using a sufficient force to press the first and the second section 302, 304 together.

Figure 4A:
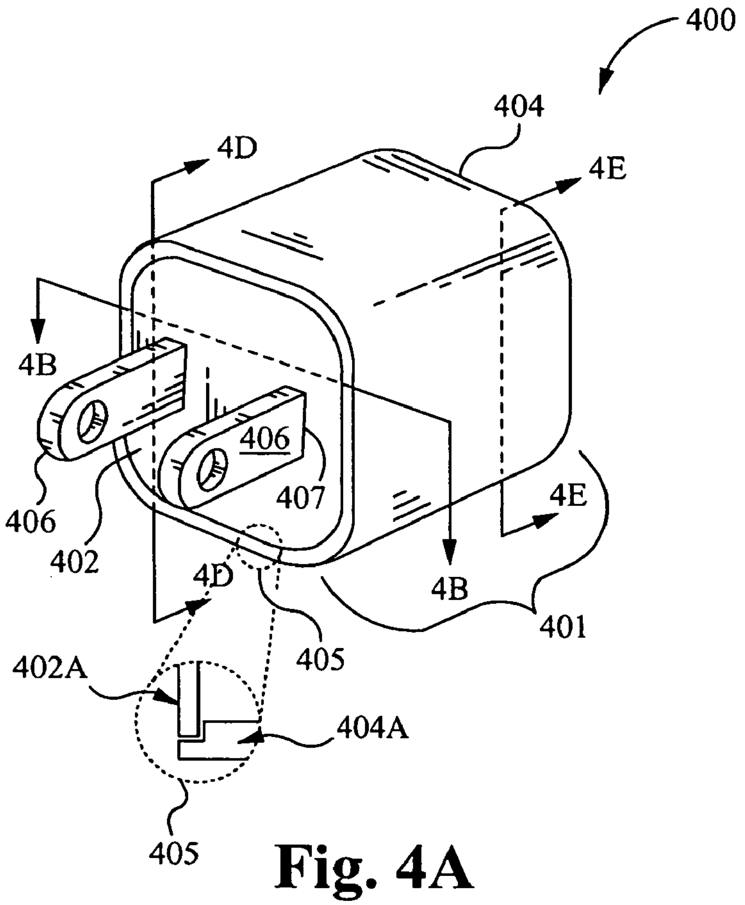
FIG. 4A illustrates a perspective view of another alternate embodiment of the invention.
Figure 4B:
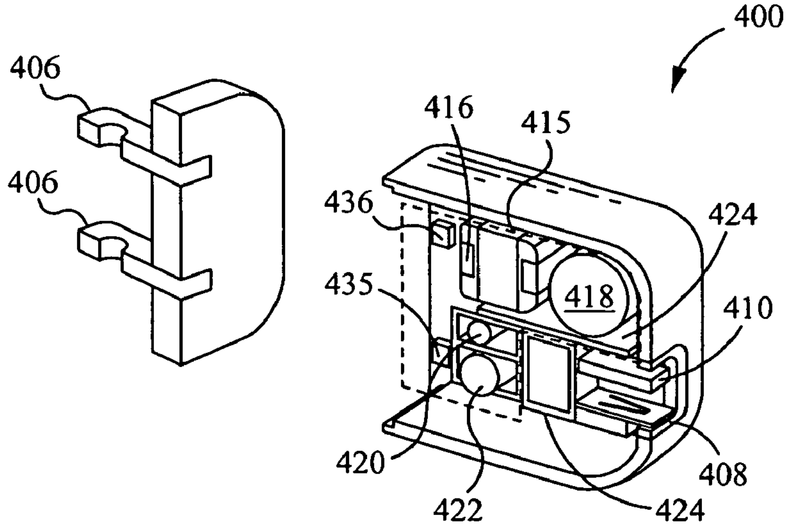
FIG. 4B illustrates a cross-sectional view of a power supply adapter, taken along the line 4B-4B of FIG. 4A, in accordance with another alternate embodiment of the invention.
Figure 4C:
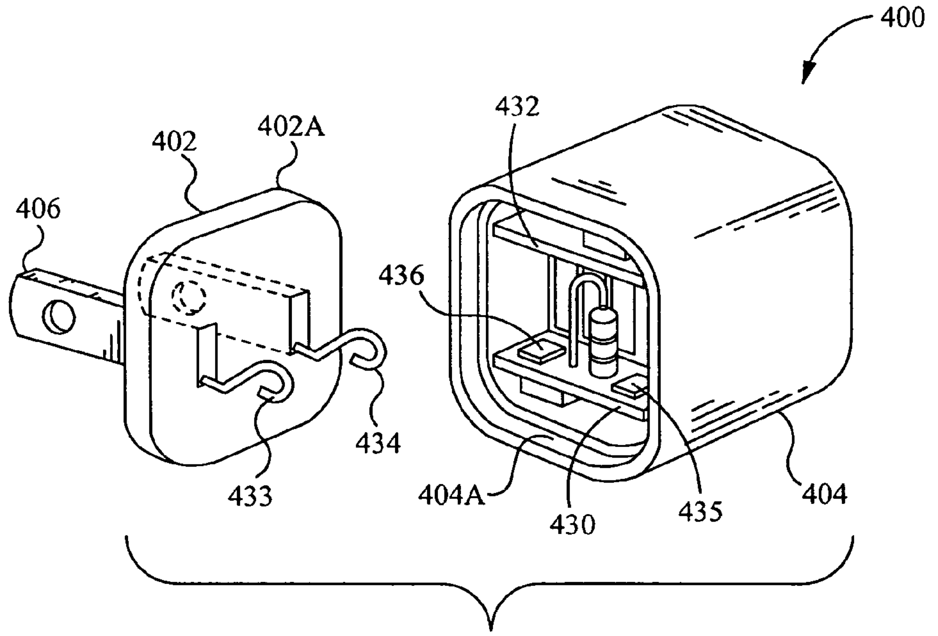
FIG. 4C illustrates a perspective view of novel features of another alternate embodiment of the invention.
Figures 4D, 4E:
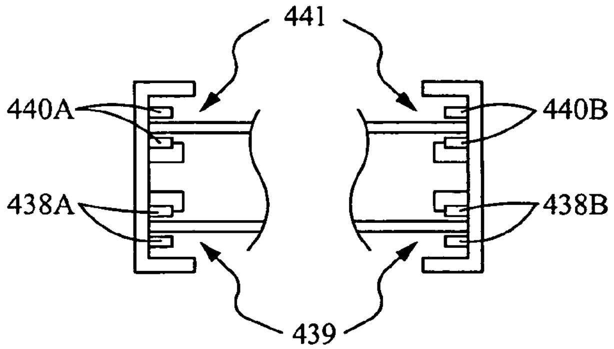
FIG. 4D illustrates a partial cross-sectional view of a power supply adapter, taken along the line 4D-4D of FIG. 4A, in accordance with another alternate embodiment of the invention.
FIG. 4E illustrates a partial cross-sectional view of a power supply adapter, taken along the line 4E-4E of FIG. 4A, in accordance with another alternate embodiment of the invention.

FIGS. 4A through 4E show yet another exemplary embodiment of a power supply adapter 400 in accordance with an embodiment of the invention. FIG. 4B shows a cross-sectional view of the power supply adapter 400, in accordance with an embodiment of the invention. The adapter 400 is configured as an integrated enclosure for a power converter circuit. The adapter 400 generally includes a first section of an enclosure 402 and a second section of an enclosure 404 coupled with the first section 402. AC power blades 406 are coupled with the first section 402. The second section 404 includes an aperture 408 in alignment with a connector receptacle 410. The connector receptacle 410 is configured for receiving a power connector (not shown). The first section 402 and the second section 404 are coupled together at an interface 405, which strengthens the coupling of the first section 402 to the second section 404.

The first section 402 of the enclosure 401 generally comprises a predominately planar structure and includes the AC power blades 406, openings 407 for receiving the AC power blades 406, and spring contacts 433, 434.

The predominately planar structure of the first section 402 includes a flat outer periphery 402A. In an exemplary embodiment, the first section 402 includes a generally rectangular shaped outer periphery 402A, here shown with rounded corners. In an alternative embodiment, the first section 402 can include a generally circular shaped outer periphery. In still another embodiment, the first section 402 can comprise various other shapes that can couple with an appropriately shaped second section 404. The first section 402 comprises a suitable durable non-metallic, electrically insulating material. In an exemplary embodiment, first section 402 comprises a plastic material. The plastic material can include a property that allows a high thermal dissipation through the wall of the first section 402. A thickness of the wall of the first section 402 can be chosen to suit a specific design requirement. In an exemplary embodiment, the thickness of the wall of the first section 402 comprises 1.8 mm.

The openings 407 for receiving the AC power blades 406 preferably comprise fitted holes. In this way, the openings 407 and the first section 402 provide support for attaching the AC power blades 406 to the first section 402. The AC power blades 406 comprise prongs or terminals made of a suitable durable conductor. In an exemplary embodiment, the AC power blades 406 comprise a metal. A person of skill in the art will appreciate the variety of possible metals suitable for the AC power blades 406. In an alternative embodiment, the first section 402 can include a ground prong or ground terminal (not shown) in addition to the AC power blades 406. The ground terminal can be supported by forming an additional opening in the first section 402. The first section 402 can be formed using methods known to a person of skill in the art such as by a molding or an extrusion process. Further, the first section 402 can include a layer of conductive material applied on an interior surface of the first section 402 to provide additional EMI shielding.

The first and the second spring contacts 433, 434, respectively, comprise suitable conductors coupled to the interior surface of the first section 402. The first and the second spring contacts 433, 434 are coupled to the first section 402 to protrude outwardly from the interior surface. The first and the second spring contacts 433, 434 are flexibly biased to securely couple with contact pads 435, 436 that are described below. The first and the second spring contacts 433, 434 provide an electrical coupling of the AC power source through the AC power blades 406 to the contact pads 435, 436 on a first and a second PCB that are described below. The first and the second spring contacts 433, 434 comprise a suitable flexible, durable and conductive material. In an exemplary embodiment, the spring contacts 433, 434 comprise a metallic material of appropriate thickness.

The second section 404 of the enclosure 401 generally includes a predominately cubical structure 404, a first and a second printed circuit board (PCB) 430, 432, respectively, a first and a second set of PCB slots 439, 441, a power converter circuit 415 (FIG. 4B), a connector receptacle 410 and an electromagnetic interference (EMI) shield 424. The second section 404 includes the aperture 408 in alignment with the connector receptacle 410. The aperture 408 allows access for the connector receptacle 410 to receive the power connector (not shown). The second section 404 provides a suitable structure for enclosing the first and the second PCB 430, 432 and attached components that are described below. In one embodiment, the second section 404 can include a thermally conductive potting material that substantially fills an empty space of an interior of the second section 404 and the enclosure 401. The potting material can thermally couple heat from heat sources, such as the output transformer 416 to the EMI shield 424 from which it can radiate into an air channel of the connector receptacle 410. In an alternative embodiment, the second section 404 can comprise a generally cylindrical shape. In still another embodiment, the second section 404 can comprise various other shapes that can couple with an appropriately shaped first section 402. The second section 404 comprises a suitable durable non-metallic, electrically insulating material. In an exemplary embodiment, second section 404 comprises a plastic material. The plastic material can include a property that allows a high thermal dissipation through the wall of the second section 404. A thickness of the wall of the second section 404 can be chosen to suit a specific design requirement. In an exemplary embodiment, the thickness of the wall of the second section 404 comprises 1.8 mm.

The first set of PCB slots 439 comprises a first and a second pair of raised edges 438A and 438B protruding from an interior surface of the second section 404. The second set of PCB slots 441 comprises a corresponding first and a second pair of raised edges 440A and 440B protruding from the interior surface of the second section 404. The pair of raised edges 438A, 438B, 440A, 440B provide surfaces for receiving and supporting the first and the second PCB 430, 432. The first and the second set of PCB slots 439, 441 can be configured on the interior surfaces of the second section 404 that are opposing each other so that the first and second pair of raised edges 438A, 438B are configured opposite and parallel to each other. Likewise, the first and second pair of raised edges 440A, 440B can be configured opposite and parallel to each other.

The first and the second printed circuit board 430, 432 preferably comprise planar, predominately rectangular structures of a size appropriate for fitting securely within the first and the second set of PCB slots 439, 441. The first PCB 430 includes a first and a second contact pad 435, 436 coupled therewith. Typically, the first and the second PCB 430, 432 comprise a non-conductive substrate patterned with conductive pathways or traces. The first and the second PCB 430, 432 provide a mechanical support and an electrical interconnection for electronic components of the power converter circuit 415 which are mounted thereon. The electrical interconnection of the electronic components of the power converter circuit 415 is provided by the conductive traces. The mechanical support is provided by holes or vias formed on the first and second PCBs 430, 432. The first and the second PCB 430, 432 are configured opposite and parallel to each other when the first and the second PCB 430, 432 are attached within the first and second set of PCB slots 439, 441.

The first and the second contacts pads 433, 434 comprise suitable conductors coupled on a periphery of the first PCB 430 that is closest to the interface 405. The first and the second contact pads 435, 436 provide an electrical coupling of the AC power source through the AC power blades 406 and the spring contacts 433, 434 to the power converter circuit 415. The first and the second contact pads 435, 436 comprise a suitable durable and conductive material. In an exemplary embodiment, the contact pads 435, 436 comprise a metallic material of appropriate thickness.

FIG. 4B shows certain elements of the power converter circuit 415. The power converter circuit 415 comprises an input rectifier 420, a regulator circuit 422, an output transformer 416 and an output capacitor 418. In an exemplary embodiment, the power converter circuit 415 is configured as a forward or a flyback power converter. A person of skill in the art will appreciate that several other power converter topologies exist, any of which that can be substituted for the topologies discussed. The input rectifier 420 converts an AC power source entering through the AC power blades 406 into a rectified voltage signal. The rectified voltage signal is coupled with the regulator circuit 422, which generates a regulated voltage signal. The regulated voltage signal is a constant voltage that is coupled to the output transformer 416. The regulator circuit 422 can include an inductor for coupling the rectified voltage signal from the input rectifier 420 to a regulator switch, such as a suitable transistor. In another embodiment, the regulator circuit 422 comprises a pulse width modulator circuit. The output transformer 416 receives the regulated voltage signal and provides electromagnetic coupling of the regulated voltage signal to the output capacitor 418, such that a regulated DC voltage is provided at the connector receptacle 410. The output transformer 416 comprises a suitable transformer which is easily integrated within the enclosure 401. The output transformer 416 includes a secondary and a primary. The primary can be coupled with the regulator circuit 422 and the secondary can be coupled with the output capacitor 418. In an exemplary embodiment, the output transformer 416 comprises a planar format transformer. The output transformer 416 can include a ferrite core. As a planar format transformer, the output transformer 416 includes electromagnetic properties that provide shielding of EMI signals which can be generated by the power converter circuit 415. A person of skill in the art will appreciate that the planar format transformer 416 allows a low-height profile and provides a high power density.

The connector receptacle 410 comprises an interface for receiving and attaching with the power connector (not shown). The connector receptacle 410 is coupled with the first and the second PCB 430, 432. The connector receptacle 410 includes conductive leads (not shown) for providing a regulated DC voltage signal to the attached power connector. In an exemplary embodiment, the connector receptacle comprises a universal serial bus (USB) receptacle. A person of skill in the art can appreciate that other types of connector receptacles for receiving other types of power connectors can be substituted for the USB connector receptacle 410.

In an alternative embodiment, a captured power cable (not shown) can be configured with the adapter 400 similar to the captured power cable 310 described above (FIGS. 3A-3F). The captured power cable (not shown) can comprise an interface for coupling with an output node (not shown) of the power converter circuit 415. The captured power cable generally includes a first and a second power conductor (not shown) an outer sheath (not shown), an integrated mounting screw (not shown), and a mounting nut (not shown). A person of skill in the art will appreciate that the captured power cable can further include other features which are not shown such as, a twisted pair data line, a drain wire, a conductive braid and a foil cover. The captured power cable can be coupled with the first and the second PCB 430, 432 via the power conductors for providing a regulated DC voltage signal to an electronic device attached with the captured power cable. In an exemplary embodiment, the captured power cable comprises a universal serial bus (USB) captured power cable. A person of skill in the art can appreciate that other types of captured power cables can be substituted for the USB captured power cable.

The EMI shield 424 comprises a rigid or semi-rigid sheet of conductive material for providing a barrier for EMI generated by the power converter circuit 415. The EMI shield 424 can also provide structural support for the connector receptacle 410 and the electronic components of the power converter circuit 415. The EMI shield 424 is coupled with the first and the second PCB 430, 432. The EMI shield 424 substantially surrounds the connector receptacle 410 and prevents EMI transfer from the power converter circuit 415 'up-line' through the attached power connector (not shown). Further, the EMI shield 424 inhibits EMI from radiating to a surrounding area beyond the adapter 400. The EMI shield 424 comprises any of a variety of conductive materials known to a person of skill in the art. In an exemplary embodiment, The EMI shied 424 comprises a metallic material. The metallic material can comprise a type of sheet metal, or alternatively a sheet mesh. Further, the EMI shield 424 provides a thermal shielding and thermal dissipation function by radiating thermal energy generated by the power converter circuit 415. In one embodiment, the EMI shield 424 can be coupled with the ferrite core of the output transformer 416 to provide a thermal spreading function.

The second section 404 can be formed using methods known to a person of skill in the art such as by a molding or an extrusion process. Further, the second section 404 can include a layer of conductive material applied on the interior surface to provide additional EMI shielding.

As shown in FIG. 4A, the interface 405 comprises a junction including the flat outer periphery 402A and a recessed surface 404A. The flat outer periphery 402A and the recessed surface 404A are configured to provide secure coupling of the first section 402 to the second section 404. The interface 405 can be further strengthened by applying a suitable adhesive between the flat outer periphery and the recessed surface 402A, 404A respectively. In an alternative embodiment, the interface 405 can be configured such that the flat outer periphery and the recessed surface 402A, 404A are interlocking; secure coupling of the first and the second section 402, 404 are achieved by using a sufficient force to press the first and the second section 402, 404 together.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A power supply adapter comprising:

a power converter circuit configured to generate a regulated voltage signal, the power converter circuit including, a rectifier coupled with AC power blades;

a regulator circuit coupled with the rectifier;

a transformer coupled with the regulator circuit, the transformer including a primary and a secondary, the transformer being coupled with the regulator circuit via the primary;

an output circuit coupled with the secondary of the transformer, the output circuit including an output capacitor; and a flexible contact coupled with each of a first and a second printed circuit board and flexibly biased to couple with a proximate end of the AC power blades.

2. The adapter of claim 1, further comprising an EMI shield comprising a sheet of conductive material substantially surrounding a connector receptacle, the EMI shield being coupled between the first and the second PCB.

3. The adapter of claim 2, wherein the EMI shield comprises one of a metallic sheet or a metallic sheet mesh.

4. The adapter of claim 1, wherein the power converter circuit comprises one of a forward or a flyback power converter.

5. The adapter of claim 1, wherein the regulator circuit includes an inductor for coupling a rectified voltage signal from the rectifier to a regulator switch.

6. The adapter of claim 5, wherein the regulator switch comprises a semiconductor switch.

7. The adapter of claim 1, wherein the transformer comprises a planar format transformer coupled with one of the first or the second PCB.

8. The adapter of claim 7, wherein the transformer includes a metallic core.

9. The adapter of claim 8, wherein the metallic core comprises a ferrite material.

10. The adapter of claim 9, wherein the transformer core is coupled with an EMI shield comprising one of a metallic sheet or a metallic sheet mesh to provide thermal spreading.

11. The adapter of claim 1, wherein the flexible contact comprises a metallic conductor.

12. The adapter of claim 1, wherein the flexible contact is configured to electrically couple an AC power source from the AC power blades to the power converter circuit.

13. The adapter of claim 1, further comprising an enclosure comprising a first section including a predominately planar structure, the AC power blades, the first and the second printed circuit board (PCB) and a second section of the enclosure coupled with the first section, the first and the second PCB including a connector receptacle coupled there between, the second section comprising a predominately cubical structure for enclosing the power converter circuit.

14. The adapter of claim 13, wherein the first section of enclosure includes openings for receiving the AC power blades and a first and a second slot for receiving the first and the second PCB.

15. The adapter of claim 13, wherein the second section of the enclosure is configured for enclosing the first and the second PCB, an EMI shield and the connector receptacle.

16. The adapter of claim 13, wherein the second section of the enclosure includes an aperture aligned with the connector receptacle, the aperture being configured for receiving a power connector.

17. The adapter of claim 16, wherein the connector receptacle includes conductive leads for providing the regulated voltage signal to the power connector.

18. The adapter of claim 13, wherein the connector receptacle comprises a universal serial bus (USB) connector receptacle.

19. The adapter of claim 13, wherein the first and the second section comprise a non-metallic material.

20. The adapter of claim 19, wherein the non-metallic material comprises a plastic material.

21. The adapter of claim 13, wherein the enclosure includes a thermally conductive potting material substantially filling an empty space of an interior of the enclosure.

22. A power supply adapter comprising:

a power converter circuit configured to generate a regulated voltage signal, the power converter circuit including, a rectifier coupled with AC power blades;

a regulator circuit coupled with the rectifier;

a transformer coupled with the regulator circuit, the transformer including a primary and a secondary, the transformer being coupled with the regulator circuit via the primary;

an output circuit coupled with the secondary of the transformer; and a flexible contact coupled with each of a first and a second printed circuit board and flexibly biased to couple with a proximate end of the AC power blades.

23. The adapter of claim 22, further comprising an EMI shield comprising a sheet of conductive material substantially surrounding a connector receptacle, the EMI shield being coupled between the first and the second PCB.

24. The adapter of claim 23, wherein the EMI shield comprises one of a metallic sheet or a metallic sheet mesh.

25. The adapter of claim 22, wherein the power converter circuit comprises one of a forward or a flyback power converter.

26. The adapter of claim 22, wherein the regulator circuit includes an inductor for coupling a rectified voltage signal from the rectifier to a regulator switch.

27. The adapter of claim 26, wherein the regulator switch comprises a semiconductor switch.

28. The adapter of claim 22, wherein the transformer comprises a planar format transformer coupled with one of the first or the second PCB.

29. The adapter of claim 28, wherein the transformer includes a metallic core.

30. The adapter of claim 29, wherein the metallic core comprises a ferrite material.

31. The adapter of claim 30, wherein the transformer core is coupled with an EMI shield comprising one of a metallic sheet or a metallic sheet mesh to provide thermal spreading.

32. The adapter of claim 22, wherein the flexible contact comprises a metallic conductor.

33. The adapter of claim 22, wherein the flexible contact is configured to electrically couple an AC power source from the AC power blades to the power converter circuit.

34. The adapter of claim 22, further comprising an enclosure comprising a first section including a predominately planar structure, the AC power blades, the first and the second printed circuit board (PCB) and a second section of the enclosure coupled with the first section, the first and the second PCB including a power cable coupled there between, the second section comprising a predominately cubical structure for enclosing the power converter circuit.

35. The adapter of claim 34, wherein the first section of enclosure includes openings for receiving the AC power blades and a first and a second slot for receiving the first and the second PCB.

36. The adapter of claim 34, wherein the second section of the enclosure is configured for enclosing the first and the second PCB, an EMI shield and the power cable.

37. The adapter of claim 34, wherein the second section of the enclosure includes an aperture aligned with the power cable, the aperture being configured for receiving a mounting screw and a mounting nut of the power cable.

38. The adapter of claim 37, wherein the power cable includes conductive leads for providing the regulated voltage signal to an attached electronic device.

39. The adapter of claim 22, wherein the power cable comprises a universal serial bus (USB) power cable.

40. The adapter of claim 22, wherein the first and the second section comprise a non-metallic material.

41. The adapter of claim 40, wherein the first and the second section comprise a plastic material.

42. The adapter of claim 22, wherein the enclosure includes a thermally conductive potting material substantially filling an empty space of an interior of the enclosure.

43. A power supply adapter comprising:

a power converter circuit configured to generate a regulated voltage signal, the power converter circuit including, a rectifier coupled with AC power blades;

a regulator circuit coupled with the rectifier;

a transformer coupled with the regulator circuit, the transformer including a primary and a secondary, the transformer being coupled with the regulator circuit via the primary; and a flexible contact coupled with each of a first and a second printed circuit board and flexibly biased to couple with a proximate end of the AC power blades.

44. The adapter of claim 43, further comprising an EMI shield comprising a sheet of conductive material substantially surrounding a connector receptacle, the EMI shield being coupled between the first and the second PCB.

45. The adapter of claim 44, wherein the EMI shield comprises one of a metallic sheet or a metallic sheet mesh.

46. The adapter of claim 43, wherein the power converter circuit comprises one of a forward or a flyback power converter.

47. The adapter of claim 43, wherein the regulator circuit includes an inductor for coupling a rectified voltage signal from the rectifier to a regulator switch.

48. The adapter of claim 47, wherein the regulator switch comprises a semiconductor switch.

49. The adapter of claim 43, wherein the transformer comprises a planar format transformer coupled with one of the first or the second PCB.

50. The adapter of claim 49, wherein the transformer includes a metallic core.

51. The adapter of claim 50, wherein the metallic core comprises a ferrite material.

52. The adapter of claim 51, wherein the transformer core is coupled with an EMI shield comprising one of a metallic sheet or a metallic sheet mesh to provide thermal spreading.

53. The adapter of claim 43, wherein the flexible contact comprises a metallic conductor.

54. The adapter of claim 43, wherein the flexible contact is configured to electrically couple an AC power source from the AC power blades to the power converter circuit.

55. The adapter of claim 43, further comprising an enclosure comprising a first section including a planar structure having a flat outer periphery, the AC power blades and a second section of the enclosure coupled with the first section, the second section comprising a predominately cubical structure for enclosing the power converter circuit and the first and the second printed circuit board (PCB), the first and the second PCB including a connector receptacle coupled there between.

56. The adapter of claim 43, wherein the first section of enclosure includes openings for receiving the AC power blades and the second section includes a first and a second set of slots for receiving the first and the second PCB.

57. The adapter of claim 43, wherein the second section of the enclosure is configured for enclosing the first and the second PCB, an EMI shield, and the connector receptacle.

58. The adapter of claim 43, wherein the second section of the enclosure includes an aperture aligned with the connector receptacle, the aperture being configured for receiving a power connector.

59. The adapter of claim 58, wherein the connector receptacle includes conductive leads for providing the regulated voltage signal to the power connector.

60. The adapter of claim 43, wherein the connector receptacle comprises a universal serial bus (USB) connector receptacle.

61. The adapter of claim 43, wherein the first and the second section comprise a non-metallic material.

62. The adapter of claim 61, wherein the first and the second section comprise a plastic material.

63. The adapter of claim 43, wherein the enclosure includes a thermally conductive potting material substantially filling an empty space of an interior of the enclosure.

* * * * *